United States Patent
Obrist et al.

(10) Patent No.: US 11,965,660 B2
(45) Date of Patent: Apr. 23, 2024

(54) METHOD FOR OPERATING A WATER CIRCULATION SYSTEM

(71) Applicant: VIEGA TECHNOLOGY GMBH & CO. KG, Attendorn (DE)

(72) Inventors: Roland Obrist, Scharans (CH); Thomas Knupfer, Chur (CH); Daniel Knupfer, Trimmis (CH)

(73) Assignee: VIEGA TECHNOLOGY GMBH & CO. KG, Attendorn (DE)

( * ) Notice: Subject to any disclaimer, the term of this patent is extended or adjusted under 35 U.S.C. 154(b) by 589 days.

(21) Appl. No.: 17/255,965

(22) PCT Filed: Jun. 26, 2018

(86) PCT No.: PCT/EP2018/067084
§ 371 (c)(1),
(2) Date: Dec. 23, 2020

(87) PCT Pub. No.: WO2020/001746
PCT Pub. Date: Jan. 2, 2020

(65) Prior Publication Data
US 2021/0124379 A1    Apr. 29, 2021

(51) Int. Cl.
*F24D 19/10* (2006.01)
*E03B 7/07* (2006.01)
*G05D 23/19* (2006.01)

(52) U.S. Cl.
CPC ............ *F24D 19/1051* (2013.01); *E03B 7/07* (2013.01); *G05D 23/1917* (2013.01); *G05D 23/1927* (2013.01)

(58) Field of Classification Search
CPC ... F24D 19/1051; E03B 7/07; G05D 23/1902; G05D 23/1917; G05D 23/1919; G05D 23/1927
See application file for complete search history.

(56) References Cited

U.S. PATENT DOCUMENTS 8,461,493 B1 *   6/2013  Cantolino ............. F24H 15/355
                                                        219/448.11

FOREIGN PATENT DOCUMENTS

DE         19818630  A1    11/1998
DE      102006054729  B3    10/2007
(Continued)

OTHER PUBLICATIONS

International Preliminary Report on Patentability and Written Opinion for corresponding PCT application No. PCT/EP2018/067084, dated Dec. 29, 2020.
(Continued)

*Primary Examiner* — Joseph F Trpisovsky
(74) *Attorney, Agent, or Firm* — Notaro, Michalos & Zaccaria P.C.

(57) ABSTRACT

A water circulation system having a feed line, a return line, a string that connects the feed line to the return line is disclosed. A temperature control unit connects the feed line to the return line, a consumer, a valve, at least one temperature sensor and a system control. A method is disclosed which includes the steps of determining a first temperature, a second temperature and a lowering time; detecting the water temperature; controlling the first temperature by controlling the valve; and controlling the second temperature by controlling the valve during the lowering time.

10 Claims, 3 Drawing Sheets

(56) References Cited

FOREIGN PATENT DOCUMENTS

| | | | |
|---|---|---|---|
| DE | 102016106817 | A1 | 10/2017 |
| EP | 2942571 | A1 | 11/2015 |
| FR | 2936042 | A1 | 3/2010 |

OTHER PUBLICATIONS

International Search Report for corresponding PCT application No. PCT/EP2018/067084, dated Apr. 1, 2019.

* cited by examiner

METHOD FOR OPERATING A WATER CIRCULATION SYSTEM

FIELD OF THE INVENTION

The present invention relates to a method for operating a water circulation system, in particular a pipeline-bound drinking or service water system.

DESCRIPTION OF THE PRIOR ART

Operating methods for water circulation systems are known from the prior art in which the water temperature must be kept above or below a predetermined temperature in order not to promote the growth of germs. The growth of germs, such as *Pseudomonas aeruginosa* or *Legionella*, is particularly favored in a temperature range of 20 to 50° C. For reasons of hygiene, i.e. to prevent the growth of germs as far as possible, the water temperature should therefore not be kept in this range. For reasons of comfort, i.e. to be able to reach a sufficiently high mixing temperature quickly, the hot water temperature is usually kept at 55° C. Since hot water pipes cannot be perfectly insulated, heat is constantly being released from the pipes to the cooler environment; usually 8 to 10 watts per meter. The greater the temperature difference between the hot water and the environment, the greater the heat loss from the pipes. To reduce the heat loss and thus save energy, a so-called night-time reduction of the hot water temperature can be allowed. For example, the temperature can be lowered by 10° C. for a period of 8 hours. The regulatory requirements in this regard can vary from country to country. As the name suggests, the temperature is preferably lowered at night, when less hot water or no hot water is used. However, experience has shown that the night shut-off is rarely or never done, either out of fear of germs or for convenience, so as not to have to wait long for hot water. Accordingly, most hot-water circulation systems do not exploit the potential for energy saving.

The above is also applicable to a circulation system with cold water. Accordingly, the cold water should be kept below 20° C. Since it is not possible to perfectly insulate the cold-water pipes, the pipes constantly absorb heat from the warmer environment. The greater the temperature difference between the cold water and the environment, the greater the heat absorption of the pipes. In order to keep the water temperature in a cold-water system permanently below 20° C., it must be cooled continuously and consequently no energy is saved.

DESCRIPTION OF THE INVENTION

It is an object of the present invention to provide a method for operating a drinking or service water system which is more energy-efficient.

This object is solved by a method with the features of claim 1. Further embodiments of the method are defined by the features of further claims.

A method for operating a water circulation system according to the invention comprises the following steps:
  Providing the water circulation system comprising at least one feed line, at least one return line, at least one strand connecting the feed line to the return line, at least one temperature control unit connecting the feed line to the return line, whereby water can circulate in a flow direction from the at least one feed line, through the at least one strand and the at least one return line back to the feed line, at least one consumer, which is arranged along the at least one strand and with which water can be removed from the circulation system, at least one valve with which the flow rate of the water in the circulation system can be changed, at least one temperature sensor with which the water temperature in a line section can be detected, at least one system control with which the data of the temperature sensors can be processed and with which the at least one valve can be actuated;
  Defining a first temperature, defining a second temperature and defining a lowering time;
  Detecting the water temperature with at least one temperature sensor;
  Setting the first temperature by setting a first flow rate with the at least one valve;
  Setting the second temperature by setting a second flow rate with the at least one valve during the lowering time.

By lowering the water temperature in the system, the temperature difference between the water and the environment is reduced, thus reducing the heat loss of the water to the environment. Such a method allows saving energy and water without reducing comfort, while at the same time meeting the strict hygiene requirements.

For example, the first temperature for a hot-water circulation system can be set within a range of 50 to 60° C. In a cold-water circulation system the first temperature can be set in a range of 10 to 20° C. To achieve this, the temperature control unit, i.e. a boiler or a cooling system, must be coordinated with the valve in such a way that the specified temperature can be reached. The higher the flow rate at the valve, the faster the water can reach the consumer from the boiler. The flow rate needed to reach the first temperature at the valve can be retrievably stored in the system control. Typically, such valves can be used to set flow rates of up to 1 liter per minute, 10 liters per minute, up to 30 liters per minute.

The second temperature can be defined directly or it can be calculated from the first temperature and a temperature difference. For example, the temperature difference can be defined in a range from 1 to 15° C. For example, the lowering time can be set in a range from 1 to 12 hours. The lowering time and the temperature difference may be defined by law. For example, the temperature difference can be 10° C. during a lowering time of 8 hours. As soon as the water temperature is lowered, i.e. the second temperature is set, the lowering time starts. It is irrelevant whether the first temperature is only slightly below the first temperature or whether the temperature corresponds to the second temperature.

In one embodiment, the method comprises the following steps:
  Defining a time window;
  Defining a threshold value;
  Calculating the absolute difference between the recorded water temperature and the first temperature;
  Integrating the difference during the time window;
  Setting the second temperature when the integral is less than or equal to the threshold;
  Detecting the time during which the second temperature is set;
  Setting the first temperature if the integral is greater than the threshold value or if the total time during which the second temperature is set is greater than the lowering time.

Due to the integral of the absolute difference between the detected water temperature and the first temperature, the method can be used for hot-water systems as well as cold-water systems. The time window moves together with the continuous time. This means that if at any point in time it is determined that, as viewed backwards within the duration of the time window, consumption was below the threshold value, then the water temperature in the strand can be lowered from that point in time or remain lowered if it has already been lowered. Alternatively, the first temperature can be set if the detected water temperature is below a permissible value in a hot-water system or above a permissible value in a cold-water system, i.e. when a permissible minimum temperature difference is exceeded. This applies to both hot-water systems and cold-water systems.

The legal values of the permissible temperature difference and the lowering time can be preset and a user can only adjust the values individually within the legally permissible ranges.

The time window can be defined as desired. For example, if no water is used within 30 minutes, the temperature can be reduced for hot-water systems or increased for cold-water systems. Time windows of 5 minutes, 10 minutes, 15 minutes, 30 minutes, 45 minutes, one hour or longer can be defined.

A consumption can be determined by means of the detected temperature curve. In a hot-water system the measured temperature usually decreases during use and in a cold-water system it usually increases.

In one embodiment, the method comprises the following steps:
  Determining a time period, wherein the second temperature is only set if the current time is within the time period.

The period can be defined by a start time and an end time or by a start time and a duration. Usually the water consumption is highest in the morning, at noon and in the evening. Accordingly, several periods of the day can be defined between the main consumption times. For example, from midnight to 6 am, from 9 am to 11 am, from 2 pm to 6 pm and from 10 pm to midnight.

In one embodiment, the time window is larger in the boundary areas of the period than in its middle area.

Usually, activities are more likely to be expected in the boundary areas of the period than in the middle area.

For example, the time period can be set from ten o'clock at night to six o'clock in the morning. It is to be expected that between ten o'clock in the evening and midnight and between five and six o'clock in the morning there is more activity, i.e. more consumption, than is to be expected between midnight and five in the morning. For example, the time window between ten o'clock in the evening and midnight can be 15 minutes and between midnight and five o'clock in the morning 30 minutes. The period can be set at any time of the day and the time windows can be graded as desired.

In one embodiment, several periods are planned distributed over one day, with the second temperature of all periods being the same, partially different or different. For example, in a period in which a reduced consumption is to be expected, a second temperature can be predetermined, which is only slightly lower than the first temperature and in a period in which almost no consumption is to be expected, a second temperature can be predetermined, which is even lower than the first temperature. For example, the second temperature can be 1° C., 2° C., 3° C., 5° C. or 10° C. lower than the first temperature. The second temperature can be set higher than the legally permitted lowering temperature, for example for reasons of comfort.

In one embodiment, the method comprises the following steps:
  Recording a temperature curve of the detected water temperatures;
  Assigning a specific consumption to the recorded temperature curve during a time interval.

For example, a small temperature difference in a small time interval corresponds to washing hands, a higher temperature difference over a longer period corresponds to taking a shower, and a large temperature difference over a long period corresponds to taking a bath. Different uses can be identified by their different temperature profile over time. The specification can be made in the factory or on site. For example, washing hands takes 5 to 15 seconds with a water consumption of 2 to 10 liters per minute, taking a shower takes 30 seconds to 15 minutes with a water consumption of 8 to 20 liters per minute and running a bath takes 10 to 30 minutes with a water consumption of more than 20 liters per minute.

In one embodiment, the method comprises the following steps:
  Defining at least one trigger threshold;
  Detecting a time interval ($I1,2,3$) during which the at least one trigger threshold is exceeded;
  Assigning a specific consumption ($V1,2,3$) to the recorded time interval ($I1,2,3$).

The trigger threshold can be set as a temperature value or as a temperature difference to the set temperature. The trigger threshold can also be the set temperature. Several different trigger thresholds can be defined.

In one embodiment, the method comprises the following steps:
  Scaling the integral of the water temperature based on specific consumption.

If hands are washed for only a short period of time and only a slight change in temperature is detected, the second temperature, which requires less energy to maintain, can be maintained. When showering or taking a bath, this can be recognized by the temperature curve and the first temperature can be set early.

In one embodiment, the method comprises the following steps:
  Recording a temperature curve based on the detected water temperatures;
  Adjusting the time window, threshold value, second temperature, lowering time or period based on the recorded temperature curves.

For example, usage habits can be identified and used to optimize energy savings. The recorded temperature curves can be used to create usage statistics. The above-mentioned parameters can be adjusted based on the usage statistics in such a way that a large amount of energy is saved without decreases in comfort, i.e. it is not necessary to wait long for hot or cold water. If it is recognized that in a certain period of time the usage is rather high, then the time window can be selected short, the threshold value low and the second temperature high. In a period with low statistical usage, the time window can be set long, the threshold value high and the second temperature low.

In one embodiment, the at least one valve is connected downstream of the at least one consumer in the direction of flow.

This ensures that in a hot-water system the water temperature at the last consumer is higher than the temperature measured at the valve. In a cold-water system, it is ensured that the water temperature at the last consumer is lower than the temperature measured at the valve.

In one embodiment, the water circulation system comprises a hot-water circulation having at least one temperature control unit (4), which can supply heat to the circulation system, for example a boiler. Alternatively or additionally, the water circulation system comprises a cold-water circulation having at least one temperature control unit (4), which can extract heat from the circulation system, for example a cooling machine.

The above-mentioned embodiments of the method can be used in any combination, as long as they do not contradict each other.

BRIEF DESCRIPTION OF THE FIGURES

Exemplary embodiments of the present invention are explained in more detail below using figures. These serve only for explanation and are not to be interpreted restrictively, wherein.

DETAILED DESCRIPTION OF THE INVENTION

Figure 1:
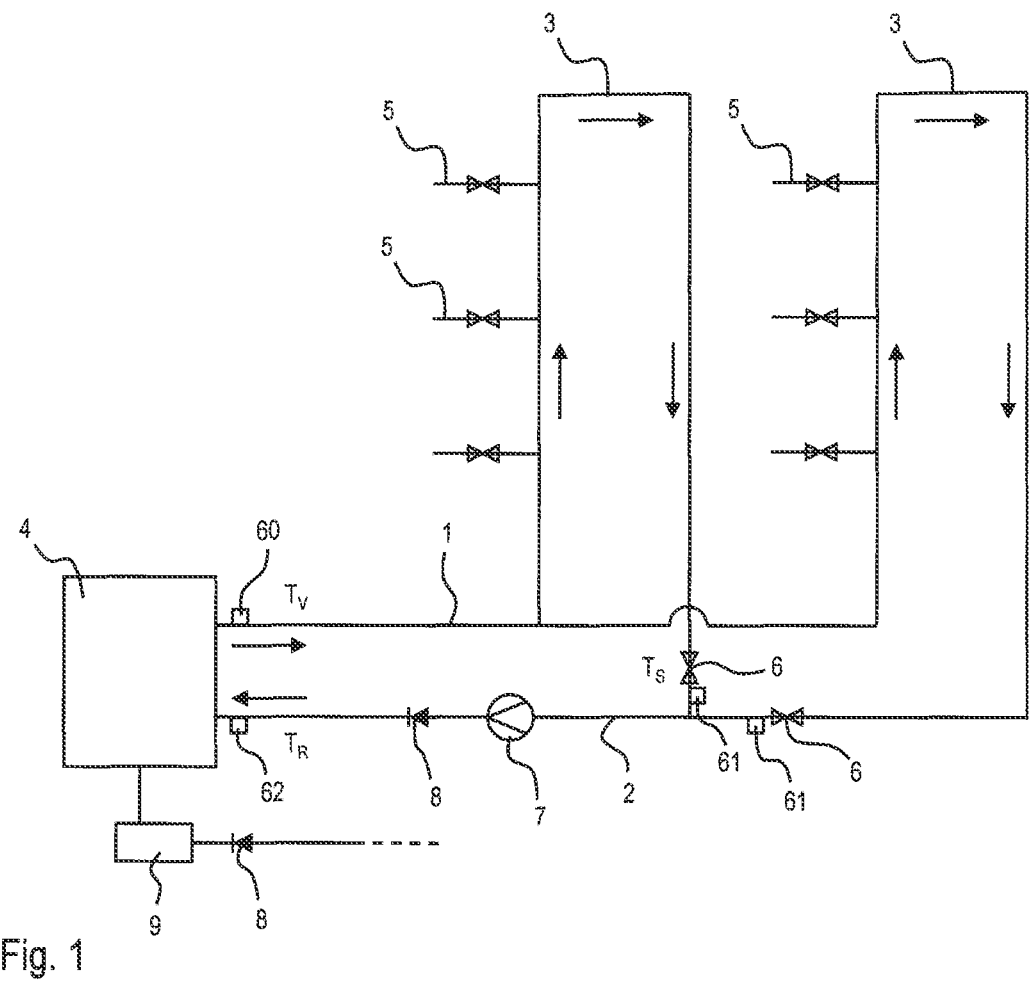
FIG. 1 shows a schematic diagram of a water circulation system.

FIG. 1 shows a schematic diagram of a water circulation system for carrying out the method according to the invention. The system comprises a feed line 1, a return line 2, two strands 3 connecting the feed line 1 with the return line 2. The system further comprises a temperature control unit 4, which connects the feed line 1 to the return line 2, allowing water to circulate in one direction from the feed line 1, via the two strands 3, the return line 2 and the temperature control unit 4 back to the feed line 1. The system also comprises several consumers 5, which are arranged along the strands 3 and with which water can be taken from the circulation system. In each strand 3, a valve 6 is provided, which is located in the area of strand 3, which opens into the return line 2. This means that the valve 6 is located in the area of the end of strand 3. With each valve 6 the flow rate of the water in the respective strand can be changed. By changing the flow rate, the temperature can be changed. The higher the flow rate, the closer the temperature of the water in strand 3 is to the temperature of the temperature control unit. A temperature sensor 60 is provided in the feed line 1, in the area of the temperature control unit 4, with which the flow temperature $T_V$ can be detected. In strand 3, in the area of the valve 6, a further temperature sensor 61 is provided, with which the strand temperature $T_S$ can be detected. In the return line 2, in the area of the temperature control unit 4, a further temperature sensor 62 is provided, with which the return temperature $T_R$ can be detected. Furthermore, the system comprises a control unit (not shown) for each strand or for the entire system, with which the data from the temperature sensors can be processed and with which the at least one valve can be actuated. A circulation pump 7 is provided in the return line 2, with which water can be transported from the strands 3 via the return line 2 to the temperature control unit 4. A non-return valve 8 is provided between pump 7 and the temperature control unit 4, which prevents water from flowing back from temperature control unit 4 to pump 7. A supply line leads from the public water connection to the temperature control unit 4. In the supply line there is a filter 9 which can clean the tap water from the public connection. Between the filter 9 and the public connection a non-return valve 8 is provided, which prevents water from the temperature control unit 4 from flowing back to the public connection.

Figure 2:
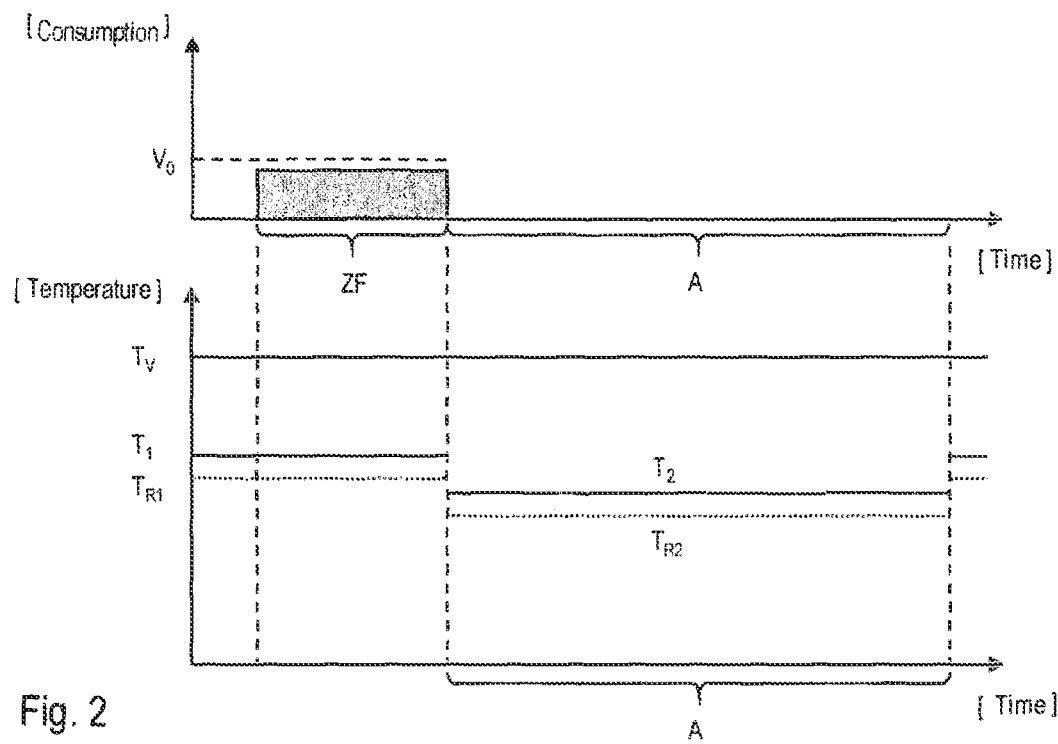
FIG. 2 shows a schematic diagram of a continuous lowering cycle according to the invention.

FIG. 2 shows a schematic diagram of a continuous lowering cycle according to the invention. In the simplest case of the method for operating a water circulation system, the valve 6 is set in normal operation so that the first temperature $T_1$ is reached. During the lowering time A, the valve 6 is set in such a way that the second temperature $T_2$ is reached. The temperature difference between the first and the second temperature can amount to 10° C. and the lowering time 8 hours. The lowering time can start at 10 pm and therefore ends at 6 am the following day. In a further development of the method, a time window $Z_F$ precedes the lowering time A. In this time window $Z_F$, the temperature curve is used to draw conclusions about the consumption. Alternatively, a flow meter can be used to determine the consumption. If the measured temperature in the time window $Z_F$ falls below a specified value, the temperature is not lowered. Only if the temperature measured during the time window is never below the specified value, the temperature is lowered. Alternatively, the difference between the first temperature and the measured strand temperature over the time window can be integrated. If the integral exceeds a threshold value $V_0$, the temperature is not lowered. If the value is below, the temperature is lowered during the lowering time.

Figure 3:
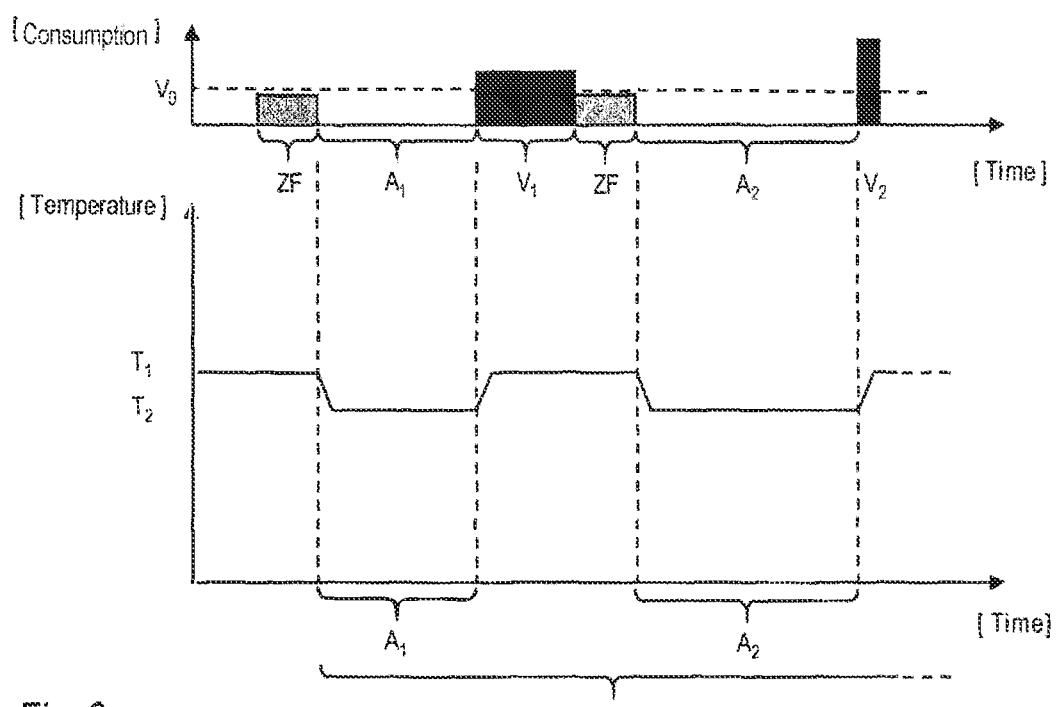
FIG. 3 shows a schematic diagram of a composite lowering cycle according to the invention.

FIG. 3 shows a schematic diagram of a composite lowering cycle according to the invention. In contrast to the contiguous lowering cycle in FIG. 2, the temperature lowering is interrupted as soon as consumption becomes too high. The lowering time is interrupted if the temperature measured in the strand is too low or if the temperature difference between the first temperature and the strand temperature integrated over the time window reaches or exceeds the threshold value. In the diagram shown, consumption remains below the threshold value V0 during the time window, whereupon the temperature is lowered from the first temperature $T_1$ to the second temperature $T_2$. After a first lowering time $A_1$, consumption exceeds the threshold value $V_0$, whereupon the temperature is raised again to the first temperature. If the consumption drops below the threshold value again, the consumption is determined again during the time window. If it remains below the threshold value, the temperature is lowered again at the end of the time window. This cycle is repeated until the sum of all lowering times corresponds to the preset lowering time. This cycle can be repeated at will throughout the day. The temperature transitions can be taken into account by integrating the temperature difference of the first temperature to the measured temperature over time. For a predetermined lowering of 10° C. during 8 hours, the total integral would be 80° C.·h. Thus, the lowering time could be extended if the temperature decrease is smaller. Theoretically, this would be 16 hours at 5° C. Alternatively, the boundary areas can be neglected and only the times during which the second temperature is measured are taken into account. In another alternative, the time is taken into account during which the measured temperature falls below a predetermined temperature in a hot-water system or exceeds it in a cold-water system. Such a trigger threshold can be defined in such a way that, for example, smaller temperature fluctuations are ignored and the time of the temperature decrease is only considered when the trigger threshold is exceeded. The trigger threshold can be 0.1° C., 0.2° C., 0.4° C., 0.5° C., 1° C., 1.5° C., 2° C., 2.5° C., 3° C. or more. The trigger threshold can also be used to detect a specific consumption. The time during which the trigger threshold is exceeded is measured. Very short times, i.e. times below 5 seconds, can be ignored. If the time is between 5 and 15 seconds, it can be concluded that, for example, someone is washing their hands at a sink. For example, a time of 30 seconds to 15 minutes can indicate that a shower is taking place and a time of 10 to 30 minutes can indicate that a bath is being run.

In a further development, an additional time period can be defined in which the reduction is allowed at all. For example, the reduction can only be permitted from 10 pm to 6 am on the following day. The water temperature of all strands is then always set to the first temperature outside of the period and can be lowered to the second temperature if this is permitted as described above.

Figure 4:
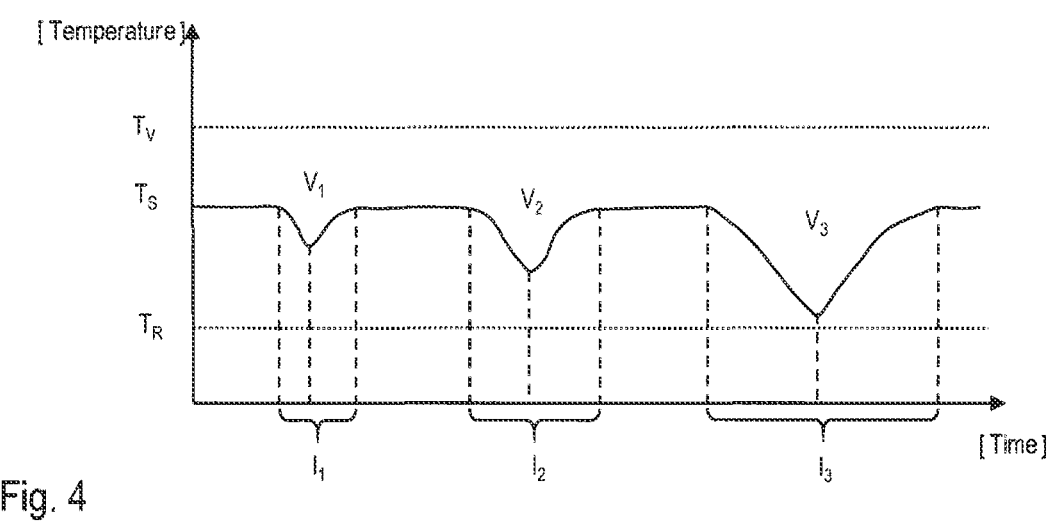
FIG. 4 shows a schematic diagram of a temperature curve in a strand of the system shown in FIG. 1.

FIG. 4 shows a schematic representation of a temperature curve in a strand of the system during specific consumptions $V_1, V_2, V_3$. If the strand temperature $T_S$ changes only slightly during a short interval $I_1$, this can be assigned to a hand washing $V_1$. A larger change in temperature over a longer interval $I_2$ can be attributed to showering $V_2$ and a large change in strand temperature over a long interval $I_3$ can be attributed to running a bath $V_3$. The recording of the temperature curve can be designed in such a way that it only takes place when the measured temperature in the strand exceeds the trigger threshold, i.e. the deviation from the set temperature exceeds a certain value. Alternatively, as described above, the time during which the trigger threshold is exceeded can be measured to determine a specific consumption $V_1, V_2, V_3$. The time interval during which the trigger threshold is exceeded can therefore be used to detect the specific consumption. A very short interval can be ignored. A short interval indicates a hand washing, a longer interval indicates a shower and a long interval indicates a bath. Several trigger thresholds can also be determined so that the determination is not based on time alone, i.e. on the length of the intervals. It can thus be determined during which time which trigger threshold is exceeded. If only the first trigger threshold is exceeded, this indicates hand washing. If the first trigger threshold is exceeded during a first interval and a second trigger threshold is exceeded during a second interval, wherein the first trigger threshold is smaller than the second and wherein the first interval is longer than the second, this indicates a shower. Thus, any number of trigger thresholds and intervals can be combined and compared for evaluation. The preset strand temperature can also be used as trigger threshold.

LIST OF REFERENCE NUMERALS

| | |
|---|---|
| 1 | Feed line |
| 2 | Return line |
| 3 | Strand |
| 4 | Temperature control unit |
| 5 | Consumer |
| 6 | Valve |
| 60 | Temperature sensor |
| 61 | Temperature sensor |
| 62 | Temperature sensor |
| 7 | Pump |
| 8 | Non-return valve |
| 9 | Filter |
| $I_{1, 2, 3}$ | Interval |
| $T_V$ | Flow temperature |
| $T_S$ | Strand temperature |
| $T_{1, 2, 3}$ | Temperature |

-continued

LIST OF REFERENCE NUMERALS

| | |
|---|---|
| ΔT | Temperature difference |
| $T_R$ | Return temperature |
| $D_{1, 2}$ | Flow rate |
| $Z_R$ | Time period |
| $Z_F$ | Time window |
| $V_{1, 2, 3}$ | Consumption |
| $V_0$ | Threshold value |
| A | Lowering time |
| $A_{1, 2}$ | Lowering time fragment |

The invention claimed is:

1. A method for operating a water circulation system, comprising the steps of:
   providing the water circulation system, comprising:
     at least one feed line (1),
     at least one return line (2),
     at least one strand (3), which connects the feed line (1) to the return line (2),
     at least one temperature control unit (4), which connects the feed line (1) to the return line (2),
   whereby water can circulate in a flow direction from said at least one feed line (1), through said at least one strand (3) and said at least one return line (2) back to said feed line (1),
     at least one consumer (5), which is arranged along the at least one strand (3) and with which water can be taken from the circulation system,
     at least one valve (6) with which the flow rate of the water in the circulation system can be changed,
     at least one temperature sensor (60,61,62) with which the water temperature in a line section can be detected,
     at least one system control with which the data of the at least one temperature sensor (60,61,62) can be processed and with which the at least one valve (6) can be actuated;
   defining a first temperature ($T_1$);
   defining a second temperature ($T_2$);
   defining a lowering time (A);
   detecting the water temperature with the at least one temperature sensor (60,61,62);
   setting the first temperature (T1) in the line section by setting a first flow rate ($D_1$) with the at least one valve (6);
   setting the second temperature ($T_2$) in the line section by setting a second flow rate ($D_2$) with the at least one valve (6) during the lowering time (A);
   defining a time window ($Z_F$);
   defining a minimum temperature difference;
   calculating the absolute value of the difference between the detected water temperature and the first temperature ($T_1$);
   setting the second temperature ($T_2$) if the absolute value of the difference is less than or equal to the minimum temperature difference;
   detecting the time during which the second temperature ($T_2$) is set;
   setting the first temperature ($T_1$) if the absolute value of the difference is greater than the minimum temperature difference or if the total time during which the second temperature ($T_2$) is set is greater than the lowering time (A).

2. The method according to claim 1, comprising the steps of:

defining a threshold value ($V_0$);
calculating the absolute value of the difference between the detected water temperature and the first temperature ($T_1$);
integrating the difference during the time window ($Z_F$);
setting the second temperature ($T_2$) if the integral is less than or equal to the threshold ($V_0$);
detecting the time during which the second temperature ($T_2$) is set;
setting the first temperature ($T_1$) if the integral is greater than the threshold ($V_0$) or if the total time during which the second temperature ($T_2$) is set is greater than the lowering time (A).

3. The method according to claim 1, comprising the step of:
defining a time period ($Z_R$), wherein the second temperature ($T_2$) is only set if the current time is within the time period ($Z_R$).

4. The method according to claim 3, wherein the time window ($Z_F$) is larger in the boundary areas of the time period ($Z_R$) than in its central area.

5. The method according to claim 3, wherein several time periods ($Z_R$) are provided distributed over one day, wherein the second temperature ($T_2$) is the same, partially different or different in all time periods ($Z_R$).

6. The method according to claim 1, comprising the steps of:
recording a temperature curve of the detected water temperatures;
assigning a specific consumption ($V_{1,2,3}$) to the recorded temperature curve during a time interval ($I_{1,2,3}$).

7. The method according to claim 1, comprising the steps of:
defining at least one trigger temperature threshold;
detecting a time interval ($I_{1,2,3}$) during which the at least one trigger temperature threshold is exceeded;
assigning a specific consumption ($V_{1,2,3}$) to the recorded time interval ($I_{1,2,3}$).

8. The method according to claim 2, comprising the steps of:
recording a temperature curve of the detected water temperatures;
adjusting the time window ($Z_F$), the threshold value ($V_0$), the second temperature ($T_2$), the lowering time (A) or the time period ($Z_R$) based on the recorded temperature curves.

9. The method according to claim 1, wherein the at least one valve (6) is connected downstream of the at least one consumer (5) in the flow direction.

10. The method according to claim 1, wherein the water circulation system comprises a hot-water circulation having the at least one temperature control unit (4) which can supply heat to the circulation system and/or wherein the water circulation system comprises a cold-water circulation having the at least one temperature control unit (4) which can extract heat from the circulation system.

* * * * *